United States Patent
Ando et al.

(10) Patent No.: US 6,536,099 B2
(45) Date of Patent: Mar. 25, 2003

(54) MAGNETORESISTIVE HEAD AND MANUFACTURING METHOD THEREFOR

(75) Inventors: Hideto Ando, Niigata-ken (JP); Kyoichi Kawase, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 83 days.

(21) Appl. No.: 09/851,823

(22) Filed: May 9, 2001

(65) Prior Publication Data

US 2001/0043444 A1 Nov. 22, 2001

(30) Foreign Application Priority Data

May 18, 2000 (JP) ........................................ 2000-152659

(51) Int. Cl.$^7$ ............................................... G11B 5/127
(52) U.S. Cl. ................. 29/603.12; 29/407.01; 29/603.1; 29/603.11; 29/603.15
(58) Field of Search ................. 29/407.01, 407.09, 29/407.1, 603.09, 603.1, 603.11, 603.12, 603.13, 603.14, 603.15, 603.16

(56) References Cited

U.S. PATENT DOCUMENTS 5,065,483 A  * 11/1991 Zammit ................... 29/603.09
5,481,791 A    1/1996 Matsubara et al.
5,742,995 A    4/1998 Amin et al.
6,321,440 B1 * 11/2001 Crawforth et al. ......... 29/603.1

* cited by examiner

Primary Examiner—David J. Walczak
Assistant Examiner—Peter deVore
(74) Attorney, Agent, or Firm—Brinks Hofer Gilson & Lione (57) ABSTRACT

In a magnetoresistive head, a marking layer is formed on at least one of the upper side of an upper shielding layer and the lower side of a lower shielding layer so as to be opposed to a magnetoresistive sensor layer. The leading ends of the magnetoresistive sensor layer and the marking layer are exposed at a medium-sliding surface on which a recording medium slides, and the leading end of the marking layer is shaped so that the length thereof in the widthwise direction is equal to the length from the leading end to the rear end of the magnetoresistive sensor layer. The center in the widthwise direction of the marking layer is placed on a straight line which intersects the magnetoresistive sensor layer via the center in the widthwise direction of the magnetoresistive sensor layer.

3 Claims, 11 Drawing Sheets

MAGNETORESISTIVE HEAD AND MANUFACTURING METHOD THEREFOR

BACKGROUND OF THE INVENTION

1. Field of the Invention.

The present invention relates to a magnetoresistive head for use in magnetic recording and playback devices, such as video tape recorders or digital audio tape recorders, so as to play back information recorded on a tapelike magnetic recording medium.

2. Description of the Related Art

Magnetic recording and playback devices, such as video tape-recorders or digital audio tape recorders, which use a magnetic tape as a recording medium, have been required to achieve a higher density and a larger capacity. Magnetoresistive heads have become applicable as playback magnetic heads which have a high sensitivity to detect signal magnetic fields and which are able to obtain a large playback output at high recording density.

FIGS. 10 to 13 show such a type of conventional magnetic recording head. In a magnetoresistive head 21, an arc-shaped medium-sliding surface 23, on which a magnetic tape slides, is formed at narrow end portions 22a of a pair of joined substrates 22 made of a nonmagnetic material. The leading ends of a magnetoresistive sensor layer 24 and marking layers 29 and 30 interposed between the substrates 22 are exposed at the medium-sliding surface 23.

Figure 11:
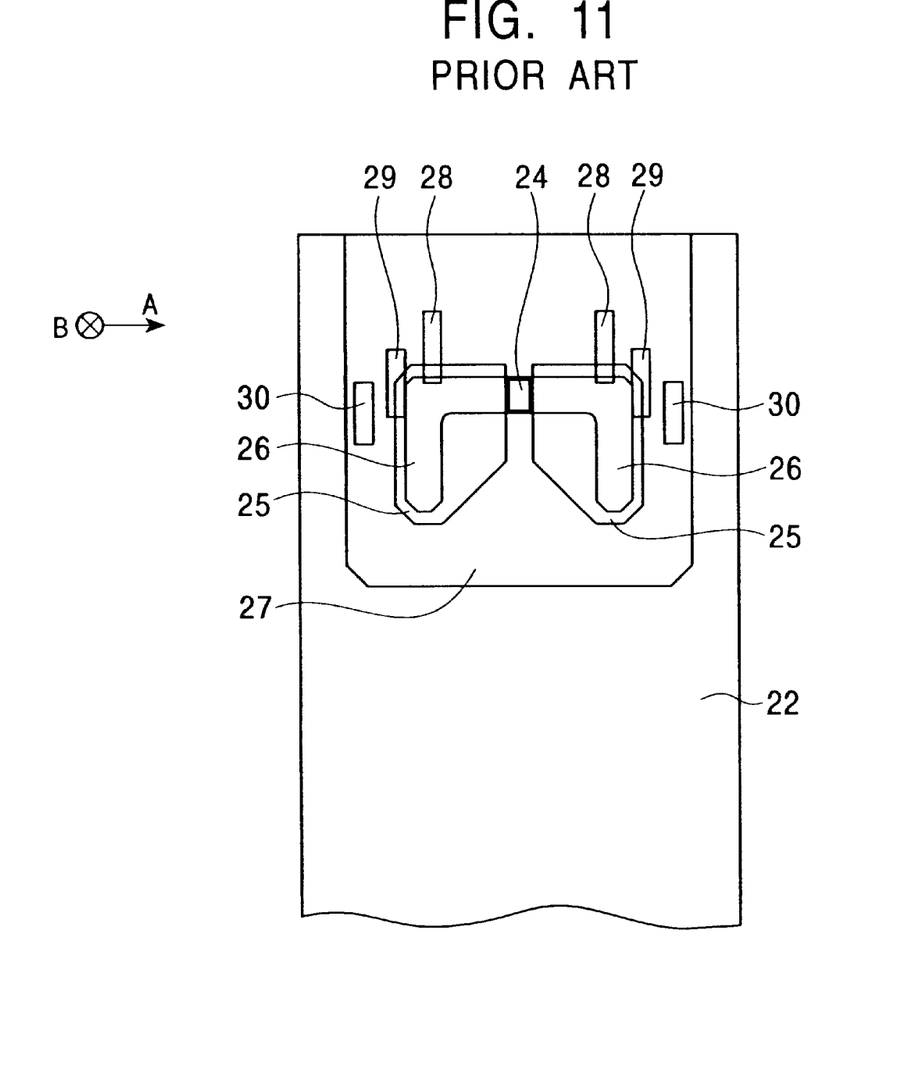
FIG. 11 is an explanatory view showing a process for manufacturing the conventional magnetoresistive head in which a laminated member and marking layers are formed.

When manufacturing the magnetoresistive head 21, as shown in FIG. 11, a lower gap layer (not shown) is formed on one of the substrates 22 with a lower shielding layer (not shown) therebetween, the magnetoresistive sensor layer 24 and a pair of bias layers 25 are formed on the lower gap layer, electrode layers 26 are respectively formed on the bias layers 25, and an upper shielding layer 27 is formed thereon, thereby forming a laminated member composed of the above layers. Then, three pairs of marking layers 28, 29, and 30 are formed on the upper shielding layer 27 so that they are symmetrical with respect to the magnetoresistive sensor layer 24 and so that they are offset with respect to one another.

Figure 12:
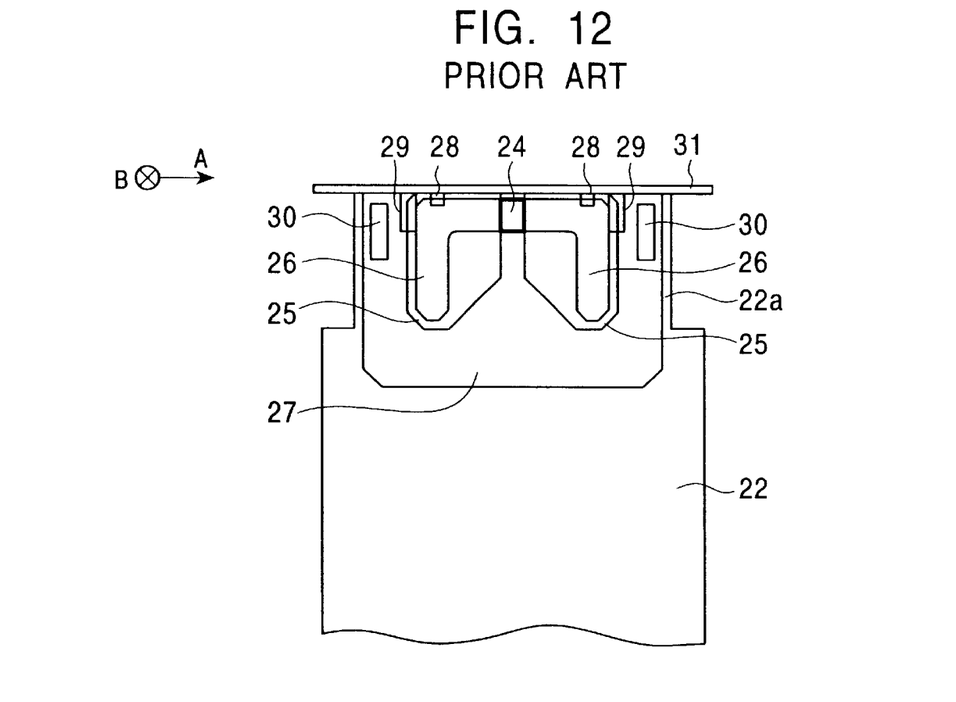
FIG. 12 is an explanatory view showing a process for manufacturing the conventional magnetoresistive head in which a lapping tape is positioned at one end of a substrate.
Figure 13:
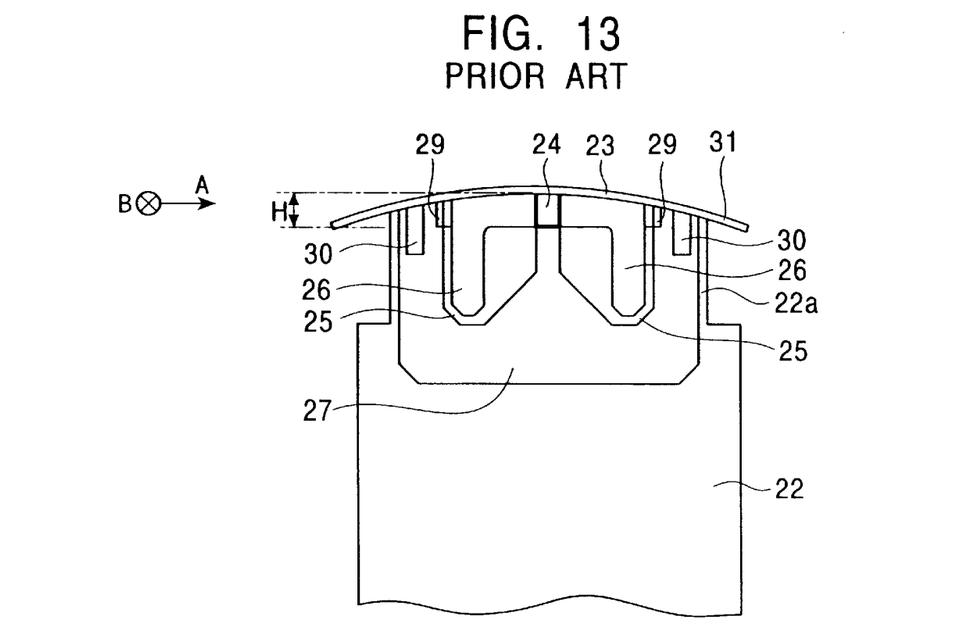
FIG. 13 is an explanatory view showing a process for manufacturing the conventional magnetoresistive head in which a medium-sliding surface is formed at one end of the substrate.

Next, the substrates 22 are joined together so as to cover the laminated member, and are subjected to cutting so as to reduce the widths of the end portions 22a. As shown in FIG. 12 in a state in which the center of a belt-shaped lapping sheet 31 extending in the direction of arrow B (into the plane of the paper) is aligned with the center of the end portions 22a of the substrates 22 in the widthwise direction (the direction of arrow A) of the magnetoresistive sensor layer 24, the end portions 22a of the substrates 22 are lapped together with the laminated member while moving the lapping sheet 31 in the direction B. As a result, as shown in FIG. 13 the arc-shaped medium-sliding surface 23 is formed, and the leading end of the magnetoresistive sensor layer 24 is exposed at the top of the medium-sliding surface 23.

In this case, by performing lapping while observing the marking layers 28, 29, and 30 exposed at the end portions 22a of the substrates 22, a length H from the leading end to the rear end of the magnetoresistive sensor layer 24 can be adjusted to a predetermined value.

Figure 10:
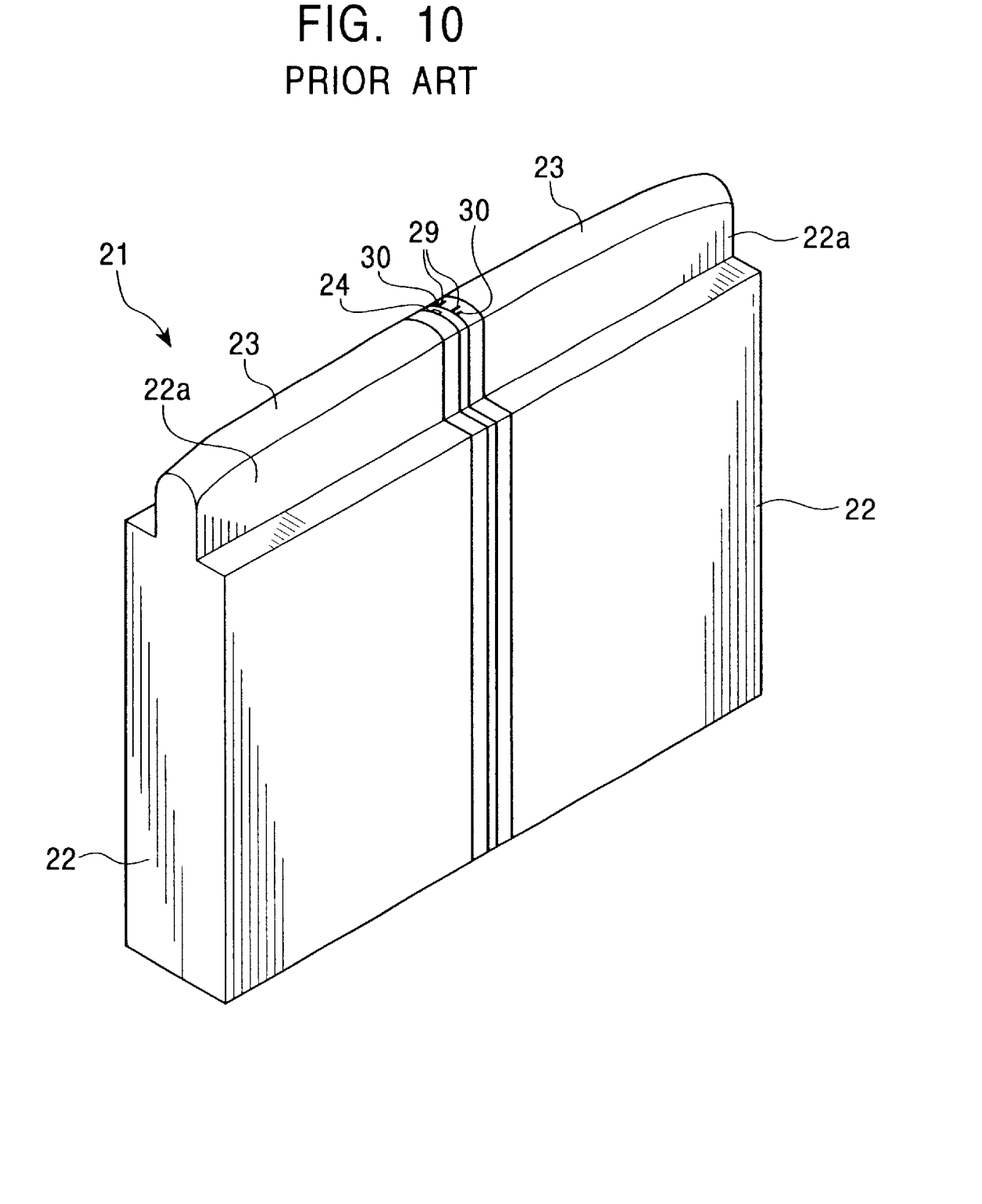
FIG. 10 is a perspective view of a conventional magnetoresistive head.

The conventional magnetoresistive head 21 thus configured and manufactured is assembled in a magnetic recording and playback device (not shown). The magnetoresistive head 21 is used in a state in which sensing current (steady-state current) is applied from the electrode layers 26 to the magnetoresistive sensor layer 24, and plays back information recorded on the magnetic tape, which slides on the medium-sliding surface 23, based on changes in resistance of the magnetoresistive sensor layer 24.

Figure 14:
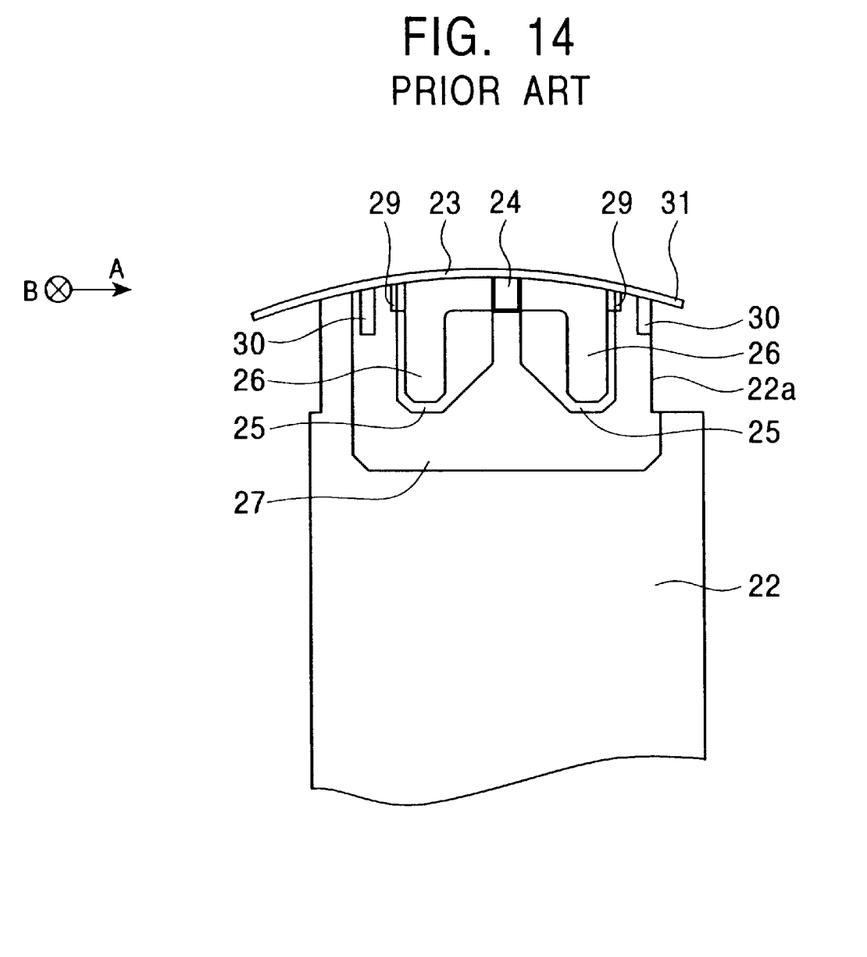
FIG. 14 is an explanatory view explaining problems of the conventional magnetoresistive head.

In the above-described conventional magnetoresistive head 21, however, by aligning the center of the lapping sheet 31 with the center of the end portions 22a of the substrates 22, the medium sliding surface 23 is arc-shaped so that the magnetic tape can smoothly slide thereon, and the leading end of the magnetoresistive sensor layer 24 is exposed at the top of the arc-shaped medium-sliding surface 23. When the end portions 22a of the substrates 22 vary in size in the widthwise direction (the direction A) of the magnetoresistive sensor layer 24 due to variations in working accuracy, as shown in FIG. 14, the leading end of the magnetoresistive sensor layer 24 is exposed at an offset position from the predetermined top of the arc-shaped medium-sliding surface 23. As a result, a spacing is likely to be formed between the magnetic tape sliding on the medium-sliding surface 23 and the leading end of the magnetoresistive sensor layer 24, and this may make it impossible to play back information recorded on the magnetic tape.

SUMMARY OF THE INVENTION

The present invention has been made in view of the above-described problems in the conventional art, and an object of the invention is to provide a magnetoresistive head in which a magnetoresistive sensor layer can be reliably exposed at a predetermined position of a medium-sliding surface so as to reliably play back information recorded on a magnetic tape and to provide a manufacturing method therefor.

In order to achieve the above object, according to an aspect of the present invention, there is provided a magnetoresistive head including a lower shielding layer, a magnetoresistive sensor layer formed on the lower shielding layer with a lower gap layer therebetween, and an upper shielding layer formed on the magnetoresistive sensor layer with an upper gap layer therebetween, wherein a marking layer is formed on at least one of the upper side of the upper shielding layer and the lower side of the lower shielding layer so as to be opposed to the magnetoresistive sensor layer, the leading ends of the magnetoresistive sensor layer and the marking layer are exposed at a medium-sliding surface on which a recording medium slides, a length of the leading end of the marking layer in the widthwise direction intersecting the direction of sliding of the recording medium is equal to a length from the leading end to the rear end of the magnetoresistive sensor layer, and the center in the widthwise direction of the marking layer is placed on a straight line that intersects the magnetoresistive sensor layer via the center thereof in the widthwise direction.

Since the medium-sliding surface can be formed in a state in which the center in the widthwise direction of a lapping sheet is aligned with the center in the widthwise direction of the magnetoresistive sensor layer, the leading end of the magnetoresistive sensor layer can be reliably exposed at a predetermined position on the medium-sliding surface, and information recorded on the recording medium can be played back reliably.

According to another aspect of the present invention, there is provided a magnetoresistive head including a lower shielding layer, a magnetoresistive sensor layer formed on the lower shielding layer with a lower gap layer therebetween, and an upper shielding layer formed on the magnetoresistive sensor layer with an upper gap layer therebetween, wherein a marking layer is formed on at least one of the upper side of the upper shielding layer and the lower side of the lower shielding layer so as to be opposed to the magnetoresistive sensor layer, the leading ends of the magnetoresistive sensor layer and the marking layer are exposed at a medium-sliding surface on which a recording medium slides, the marking layer is shaped so that a length thereof in the widthwise direction intersecting the direction of sliding of the recording medium changes at a fixed rate from the leading end toward the rear end, and a marker portion formed in the marking layer for detecting the center in the widthwise direction of the magnetoresistive sensor layer is placed on a straight line that intersects the magnetoresistive sensor layer via the center thereof in the widthwise direction.

Since the medium-sliding surface can be formed in a state in which the center in the widthwise direction of a lapping sheet is aligned with the center in the widthwise direction of the magnetoresistive sensor layer, the leading end of the magnetoresistive sensor layer can be reliably exposed at a predetermined position on the medium-sliding surface, and information recorded on the recording medium can be played back reliably.

Preferably, the marking layer is made of the same material as that of the upper and lower shielding layers and is directly formed on at least one of the upper and lower shielding layers.

This makes it possible to form the marking layer so as to be connected to the upper shielding layer and to form the lower shielding layer so as to be connected to the marking layer. This simplifies the process for manufacturing the magnetoresistive head.

According to a further aspect of the present invention, there is provided a magnetoresistive head manufacturing method including the steps of forming on a substrate a laminated member composed of a lower shielding layer, a lower gap layer, a magnetoresistive sensor layer, an upper gap layer, and an upper shielding layer stacked from the bottom in that order; forming, on at least one of the upper and lower surfaces of the laminated member, a marking layer which has a marker portion for detecting the center position in the widthwise direction of the magnetoresistive sensor layer as viewed from one end of the substrate and whose size in the widthwise direction changes at a fixed rate from the one end of the substrate toward the other end; and forming an arc-shaped medium-sliding surface on which a recording medium slides, by lapping the one end of the substrate together with the laminated member in a state in which the center in the widthwise direction of a lapping sheet with the center in the widthwise direction of the magnetoresistive sensor layer by using the marker portion, exposing the marking layer from the medium-sliding surface so that a length in the widthwise direction of the marking layer is equal to a predetermined value corresponding to a length from the leading end to the rear end of the magnetoresistive sensor layer, and thereby exposing the leading end of the magnetoresistive sensor layer at the top of the arc-shaped medium-sliding surface.

Since the center of the lapping sheet can be aligned with the center of the magnetoresistive sensor layer in the widthwise direction, the leading end of the magnetoresistive sensor layer can be reliably exposed at a predetermined position on the medium-sliding surface.

Preferably, the marking layer has a slot extending from the one end of the substrate toward the other end, and the slot serves as the marker portion.

Preferably, the marking layer is shaped like a right-angled triangle having a side which extends from the one end of the substrate toward the other end and passes through the center in the widthwise direction of the magnetoresistive sensor layer, and the side serves as the marker portion.

This makes it possible to form the marker portion easily.

Further objects, features, and advantages of the present invention will become apparent from the following description of the preferred embodiments with reference to the attached drawings.

DESCRIPTION OF THE PREFERRED EMBODIMENTS

A magnetoresistive head according to a first embodiment of the present invention will be described below with reference to FIGS. 1 to 5.

Figure 1:
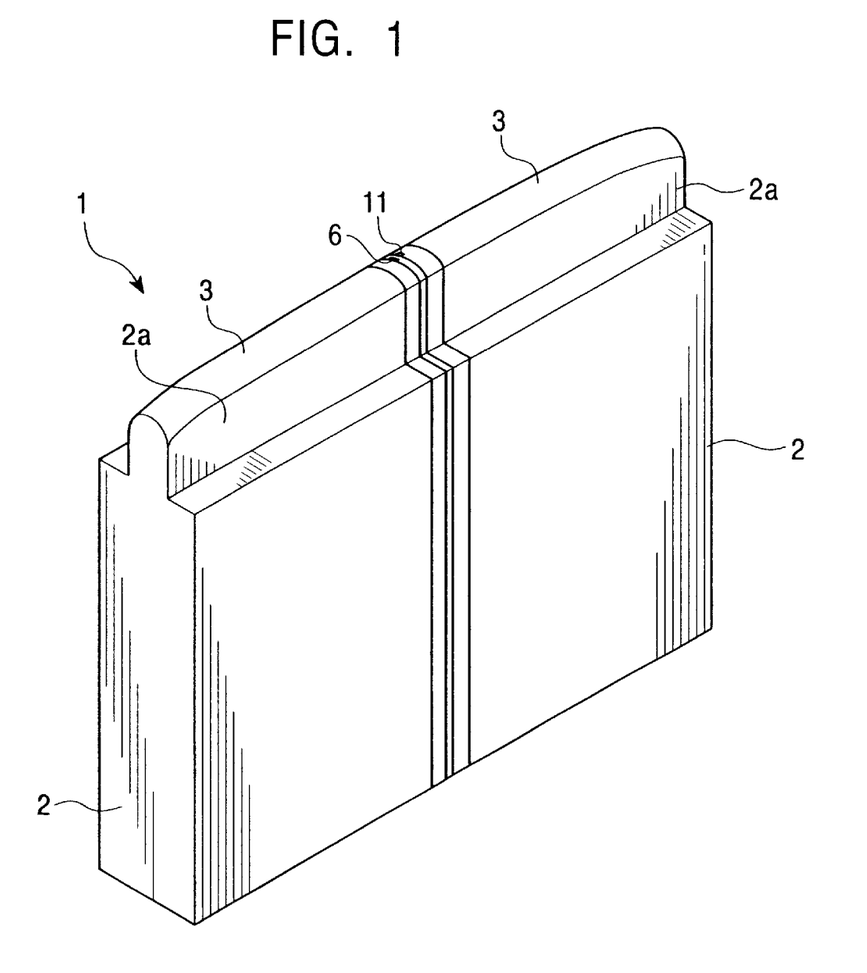
FIG. 1 is a perspective view of a magnetoresistive head according to a first embodiment of the present invention.

Referring to FIG. 1, in a magnetoresistive head 1 of this embodiment, an arc-shaped medium-sliding surface 3 is formed, on which a magnetic tape slides, is formed in narrow end portions 2a of a pair of joined substrates 2 made of a nonmagnetic material. The leading ends of a magnetoresistive sensor layer 6 and a marking layer 11, which are interposed between the substrates 2, are exposed at the medium-sliding surface 3.

Figure 2:
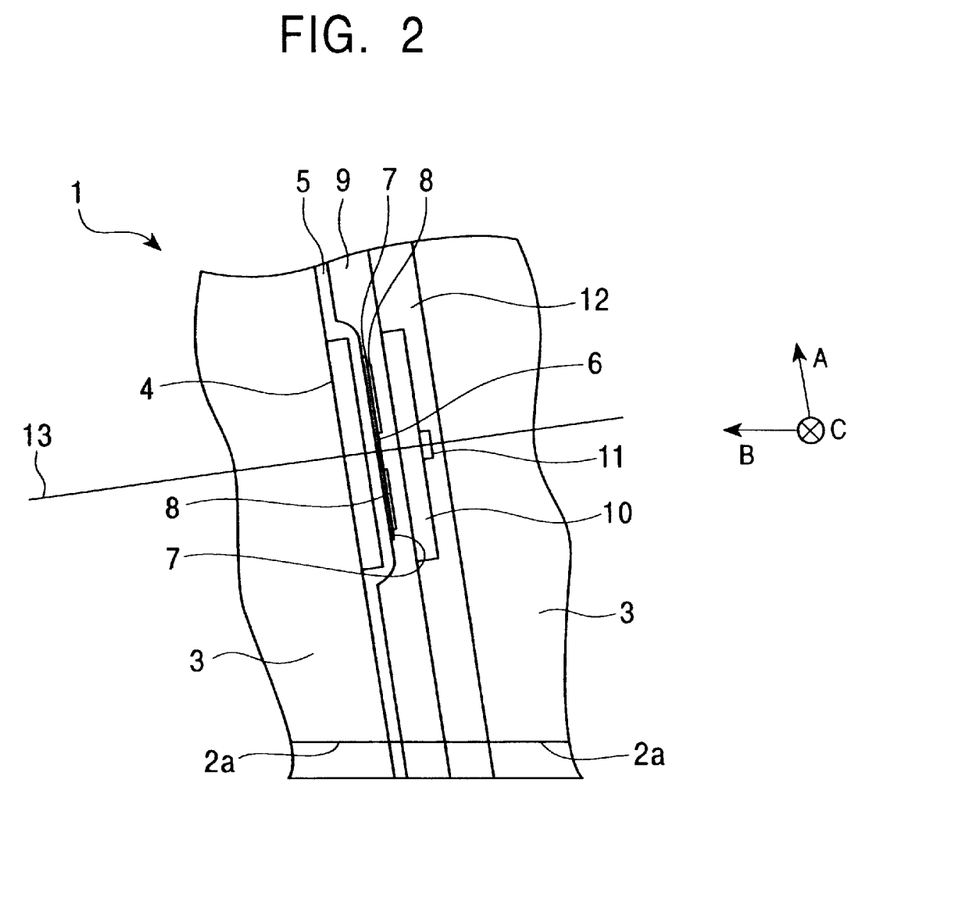
FIG. 2 is plan view of the magnetoresistive head, as viewed from the side of a medium-sliding surface.

FIG. 2 is a plan view of the magnetoresistive head 1, as viewed from the side of the medium-sliding surface 3. The magnetoresistive sensor layer 6 and a pair of bias layers 7 are formed on a lower shielding layer 4 formed in one of the substrates 2 with a lower gap layer 5 therebetween, and electrode layers 8 are respectively formed on the bias layers 7. An upper shielding layer 10 is formed on the magnetoresistive sensor layer 6 with an upper gap layer 9 therebetween. The marking layer 11, which is much thicker than the magnetoresistive sensor layer 6, is formed on the upper shielding layer 10, and an insulating layer 12 is formed on the marking layer 11. The center in the widthwise direction (the direction of arrow A) of the marking layer 11 is placed on a straight line 13 which intersects the magnetoresistive sensor layer 6 at right angles via the center thereof in the widthwise direction (the direction of the arrow A). The widthwise directions of the magnetoresistive sensor layer 6 and the marking layer 11 intersect the direction of sliding of a magnetic tape which slides on the medium-sliding surface 3 (the direction of arrow B).

The layers of the magnetoresistive head 1 will be sequentially described in detail.

The upper shielding layer 10 and the lower shielding layer 4 are made of a soft magnetic material, such as a NiFe alloy, and serve to prevent the magnetoresistive sensor layer 6 from being affected by magnetic fields other than a leakage magnetic field from the magnetic tape.

The upper gap layer 9 and the lower gap layer 5 are made of a nonmagnetic insulating material, such as alumina, and serve to insulate the magnetoresistive sensor layer 6, the bias layers 7, and the electrode layers 8 from the upper and lower shielding layers 10 and 4.

The magnetoresistive sensor layer 6 is composed of three layers, a soft magnetic layer (SAL layer) made of a NiFe alloy, a nonmagnetic layer (shunt layer) made of tantalum, and a magnetoresistive layer (MR layer) made of a NiFeNb alloy, which are stacked from the bottom in that order.

The bias layers 7 are made of a hard magnetic conductive material, such as a cobalt platinum alloy, and serve to apply a bias magnetic field in the widthwise direction (the direction of the arrow A) to the magnetoresistive sensor layer 6.

The electrode layers 8 are made of a nonmagnetic conductive material, such as copper or tungsten, and serve to apply a sensing current (steady-state current) to the magnetoresistive sensor layer 6 via the bias layers 7.

The marking layer 11 is made of a soft magnetic material, such as a NiFe alloy, in a manner similar to that of the upper and lower shielding layers 10 and 4, and is directly formed on the upper shielding layer 10.

Figure 3:
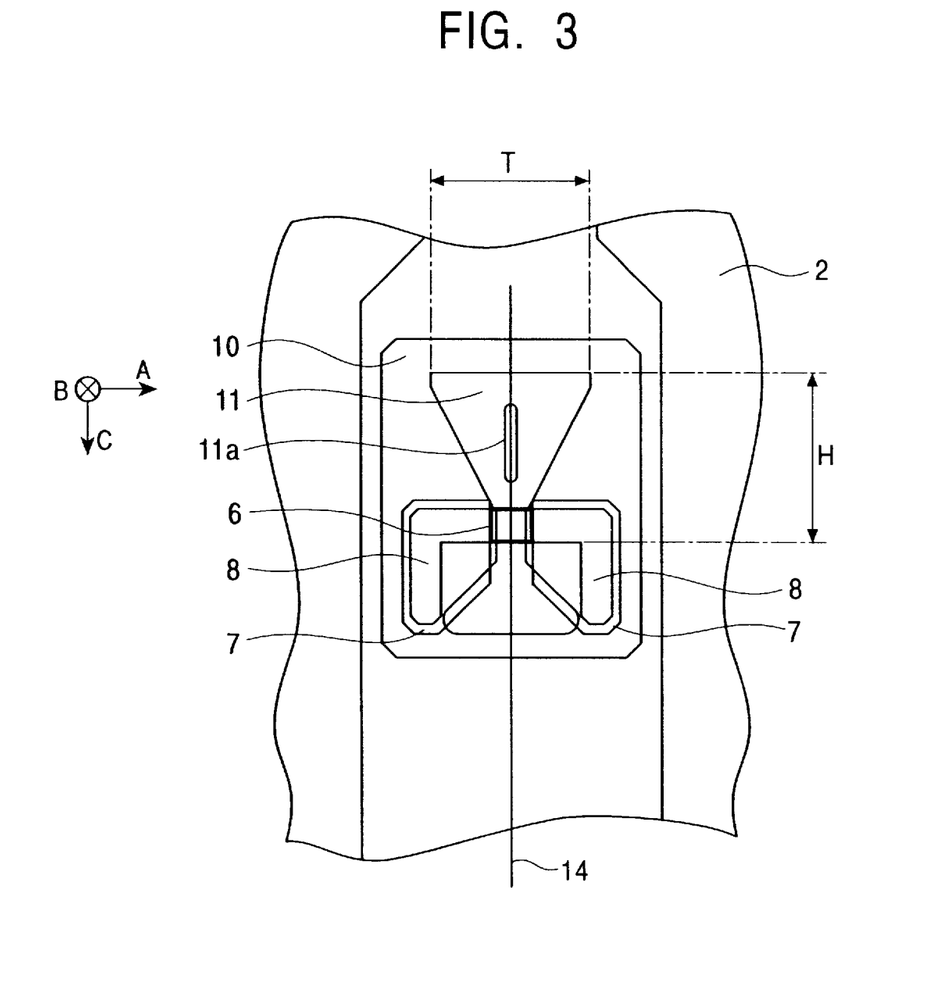
FIG. 3 is an explanatory view showing a process for manufacturing the magnetoresistive head in which a laminated member and a marking layer are formed.

Description will now be given of a method for manufacturing the magnetoresistive head 1 with such a configuration First, a laminated member is formed on one of the substrates 2 by sequentially stacking the lower shielding layer 4, the lower gap layer 5, the magnetoresistive sensor layer 6, the bias layers 7, the electrode layers 8, the upper gap layer 9, and the upper shielding layer 10. Then, as shown in FIG. 3, the marking layer 11 shaped like an isosceles triangle is formed on the upper shielding layer 10. The marking layer 11 has a slot-shaped marker portion 11a which is placed on the straight line which passes through the center of the magnetoresistive sensor layer 6 in the widthwise direction (direction A) and extends from the end portion 2a of the substrate 2 toward the other end portion (in the direction of arrow C). A length T of the marking layer 11 in the widthwise direction (direction A) varies at a fixed rate from one end portion the substrate 2 toward the other end, and a length H from the leading end of the marking layer 11 to the rear end of the magnetoresistive sensor layer 6 is constantly equal to the length T.

Figure 4:
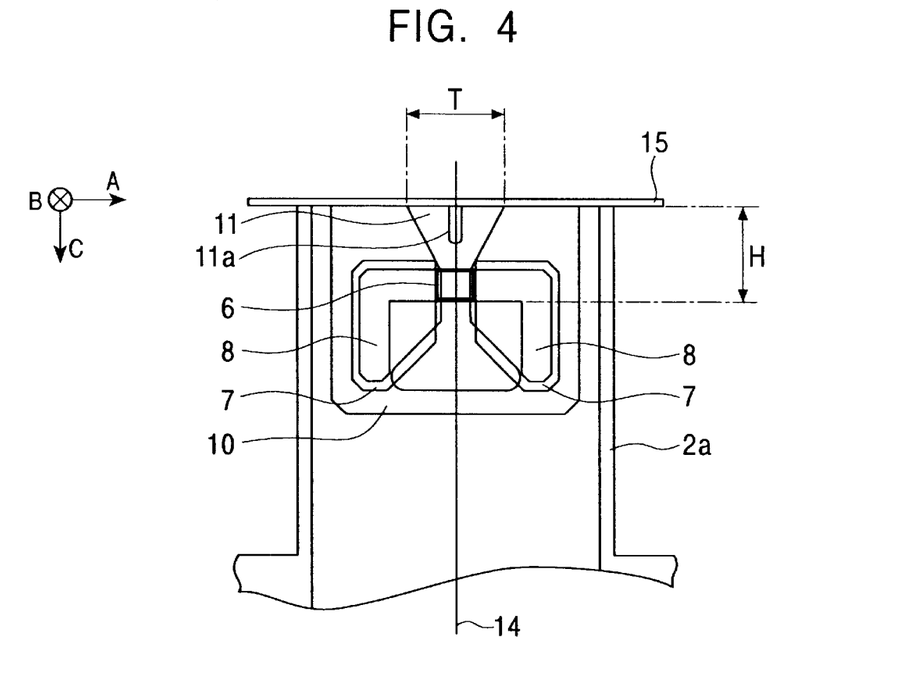
FIG. 4 is an explanatory view showing a process for manufacturing the magnetoresistive head in which a lapping tape is positioned at one end of a substrate.
Figure 5:
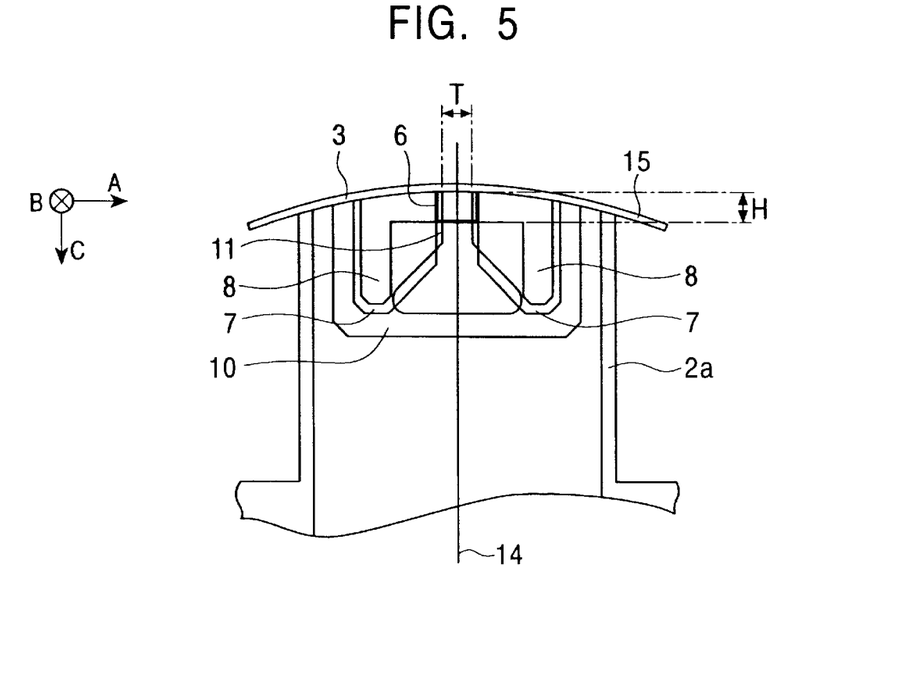
FIG. 5 is an explanatory view showing a process for manufacturing the magnetoresistive head in which a medium-sliding surface is formed at one end of the substrate

Next, the substrates 2 are joined together so as to cover the laminated member and the marking layer 11, and are subjected to cutting so as to reduce the widths of the end portions 2a. This allows the marker portion 11a to be visible from the side of the end portions 2a of the substrates 2. In a state in which the center of a belt-shaped lapping sheet 15 extending in the direction of the arrow B (into the plane of the paper) is aligned with the marker portion 11a of the marking layer 11 in the widthwise direction (direction A) of the magnetoresistive sensor layer 6, as shown in FIG. 4, the end portions 2a of the substrates 2 are lapped together with the laminated member while moving the lapping sheet 15 in the direction B. As a result, the arc-shaped medium-sliding surface 3 is formed, and the leading end of the magnetoresistive sensor layer 6 is exposed at the top of the sliding surface 3, as shown in FIG. 5.

In this case, since the lengths T and H are set to be constantly equal to each other, the length H of the magnetoresistive sensor layer 6 from the leading end to the rear end can be adjusted to a predetermined value by performing lapping while observing the length T in the widthwise direction of the marking layer 11 exposed at the end portions 2a of the substrates 2. The manufacturing of the magnetoresistive head 1 is completed in this way. After manufacturing, the length T in the widthwise direction of the marking layer 11 at the leading end exposed at the top of the arc-shaped medium-sliding surface 3 is equal to the length H of the magnetoresistive sensor layer 6 from the leading end to the rear end.

The magnetoresistive head 1 thus configured and manufactured is assembled in a magnetic recording and playback device (not shown). The magnetoresistive head 1 is used in a state in which sensing current (steady-state current) is applied from the electrode layers 8 to the magnetoresistive sensor layer 6, and plays back information recorded on the magnetic tape sliding on the medium-sliding surface 3 based on changes in resistance of the magnetoresistive sensor layer 6.

In the magnetoresistive head 1, the center in the widthwise direction (direction A) of the magnetoresistive sensor layer 6, which is much thinner than the marking layer 11, can be detected by using the marker portion 11a formed in the marking layer 11, and the center in the widthwise direction of the lapping sheet 15 can be aligned with the center of in the widthwise direction of the magnetoresistive sensor layer 6 by aligning the center of the lapping sheet 15 with the marker portion 11a of the marking layer 11 in the widthwise direction of the magnetoresistive sensor layer 6. Therefore, even when the end portions 2a of the substrates 2 vary in size in the widthwise direction of the magnetoresistive sensor layer 6 due to variations in working accuracy, the leading end of the magnetoresistive sensor layer 6 can be reliably exposed at the top of the arc-shaped medium-sliding surface 3 serving as a predetermined position. This makes it possible to reliably play back information recorded on the magnetic tape.

While the first embodiment has a structure in which the marking layer 11 is placed on the upper shielding layer 10, the present invention is not limited to the structure. The marking layer 11 having the marker portion 11a may be directly formed under the lower shielding layer 4 by being formed on one of the substrates 2 prior to forming the laminated member.

A magnetoresistive head according to a second embodiment of the present invention will now be described with reference to FIGS. 6 to 9.

Figure 6:
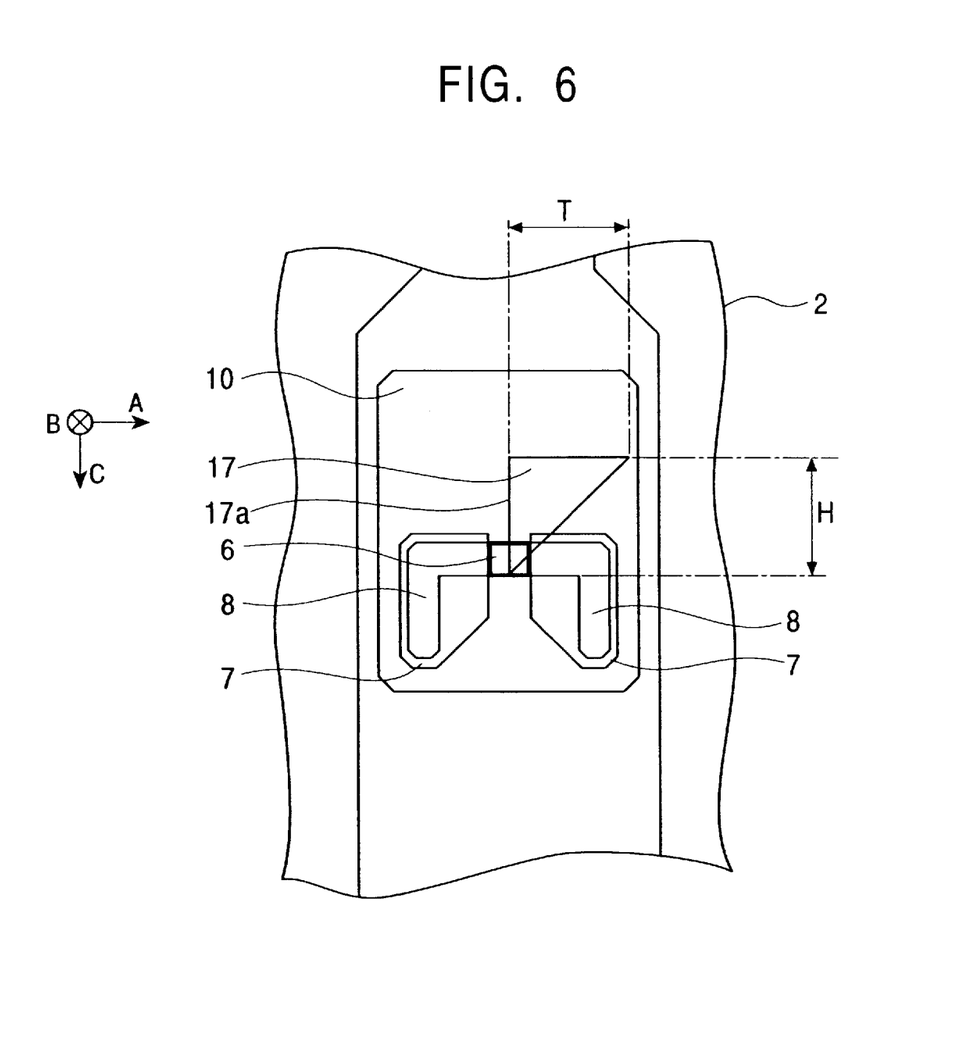
FIG. 6 is an explanatory view showing, a process for manufacturing a magnetoresistive head according to a second embodiment of the present invention in which a laminated member and a marking layer are formed.

A magnetoresistive head 16 of the second embodiment is different from the first embodiment only in that, after the above-described laminated member is formed on one of the substrates 2, a marking layer 17 shaped like a rectangular equilateral triangle is formed, instead of the marking layer 11, on the upper shielding layer 10. As shown in FIG. 6, the marking layer 17 has a side which extends from one end of the substrate 2 toward the other end (in the direction of arrow C) and passes through the center in the widthwise direction (the direction of arrow A) of a magnetoresistive sensor layer 6, and the side serves as a marker portion 17a for detecting the center in the widthwise direction of the magnetoresistive sensor layer 6. Other structures are similar to those in the first embodiment.

Figure 7:
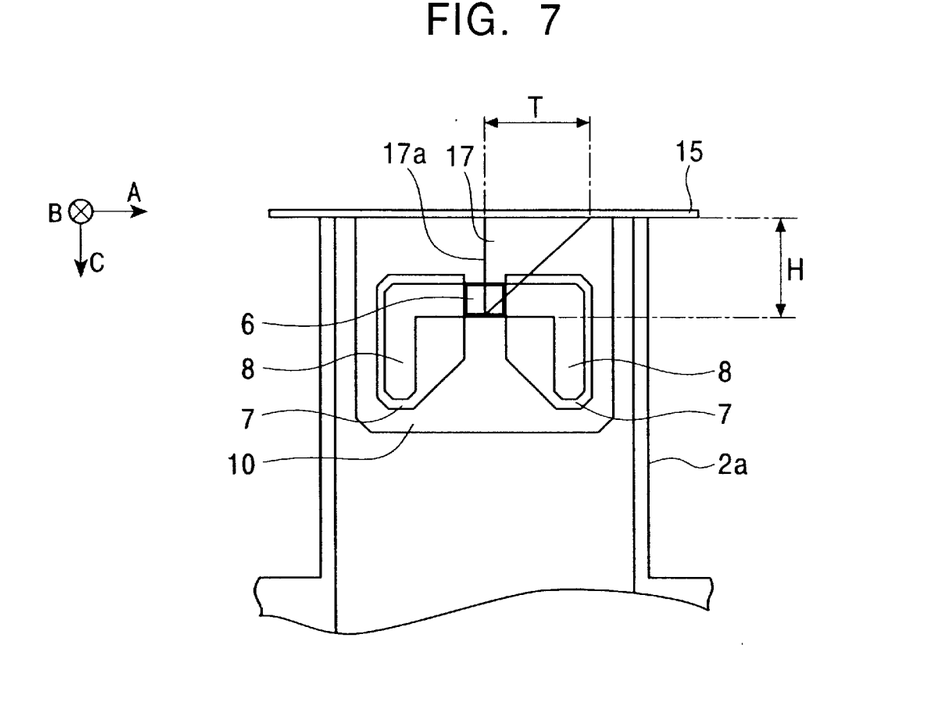
FIG. 7 is an explanatory view showing a process for manufacturing the magnetoresistive head in which a lapping tape is positioned at one end of a substrate.
Figure 8:
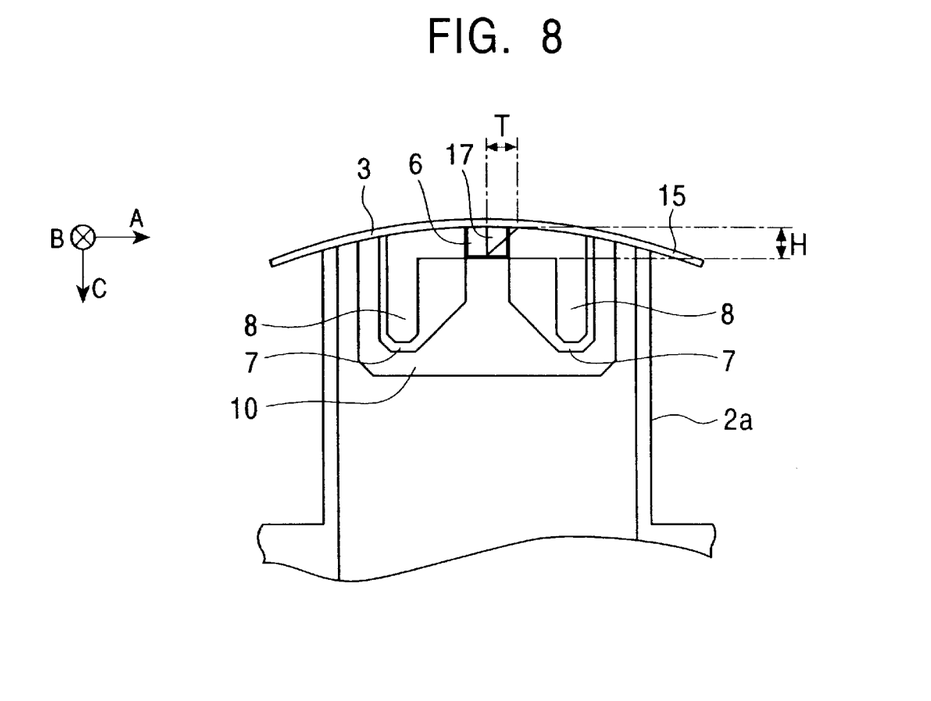
FIG. 8 is an explanatory view showing a process for manufacturing the magnetoresistive head in which a medium-sliding surface is formed at one end of the substrate.

When manufacturing the magnetoresistive head 16, both substrates 2 are joined together so as to cover the laminated member and the marking layer 17, and are subjected to cutting so as to reduce the widths of one end portions 2a thereof. Thereby, the marker portion 17a is visible from the side of one end portions 2a of the substrates 2. In a state in which the center of a belt-shaped lapping sheet 15 extending in the direction of arrow B (into the plane of the paper) is aligned with the marker portion 17a of the marking layer 17, as shown in FIG. 7 the end portions 2a of the substrates 2 are lapped together with the laminated member while moving the lapping sheet 15 in the direction B. As a result, an arc-shaped medium-sliding surface 3 is formed, and the leading end of the magnetoresistive sensor layer 6 is exposed at the top of the medium-sliding surface 3.

In this case, since a length T in the widthwise direction (the direction A) of the marking layer 17 is set to vary at a fixed rate from the end portions 2a of the substrates 2 toward the other end portions, a length H from the leading end to the rear end of the magnetoresistive sensor layer 6 can be adjusted to a predetermined value by performing lapping while observing the widthwise length T of the marking layer 17 exposed at the end portions 2a of the substrates 2.

Figure 9:
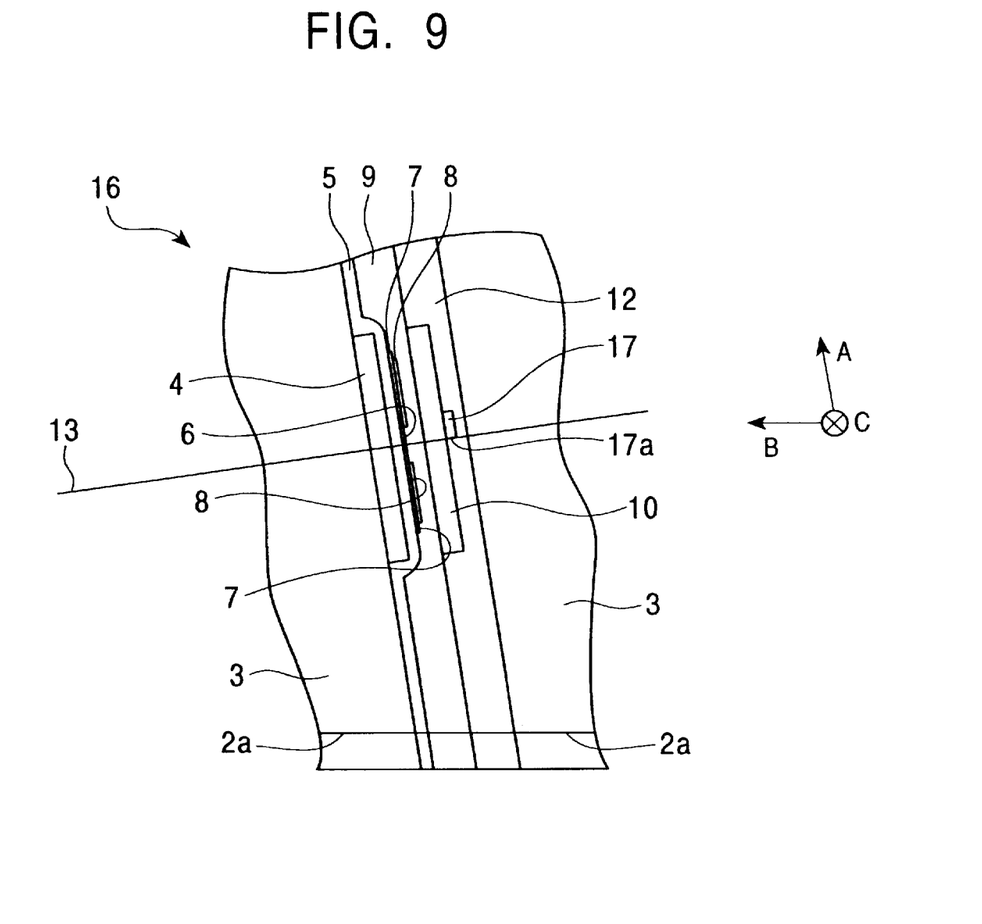
FIG. 9 is a plan view of the magnetoresistive head, as viewed from the side of the medium-sliding surface.

FIG. 9 is a plan view of the magnetoresistive head 16 thus manufactured, as viewed from the side of the medium-sliding surface 3. Referring to FIG. 9 the marker portion 17a of the marking layer 17 formed on an upper shielding layer 10 is placed on a straight line 13 which intersects the magnetoresistive sensor layer 6 via the center thereof in the widthwise direction (the direction of arrow A), and the widthwise directions of the magnetoresistive sensor layer 6 and the marking layer 17 intersect the direction of sliding of the magnetic tape which slides on the medium-sliding surface 3 (the direction of arrow B).

The magnetoresistive head 16 thus configured and manufactured is assembled in a magnetic recording and playback device (not shown). The magnetoresistive head 16 is used in a state in which sensing current (steady-state current) is applied from electrode layers 8 to the magnetoresistive sensor layer 6, and plays back information recorded on the magnetic tape sliding on the medium-sliding surface 3 based on changes in resistance of the magnetoresistive sensor layer 6.

In the magnetoresistive head 16, the center in the widthwise direction (direction A) of the magnetoresistive sensor layer 6, which is much thinner than the marking layer 17, can also be detected by using the marker portion 17a formed in the marking layer 17, and the center in the widthwise direction of the lapping: sheet 15 can be aligned with the center of in the widthwise direction of the magnetoresistive sensor layer 6 by aligning the center of the lapping sheet 15 with the marker portion 17a of the marking layer 17 in the widthwise direction of the magnetoresistive sensor layer 6. Therefore, even when the end portions 2a of the substrates 2 vary in size in the widthwise direction of the magnetoresistive sensor layer 6 due to variations in working accuracy, the leading end of the magnetoresistive sensor-layer 6 can be reliably exposed at the top of the arc-shaped medium-sliding surface 3 serving as a predetermined position. This makes it possible to reliably play back information recorded on the magnetic tape.

While the second embodiment has a structure in which the marking layer 17 is placed on the upper shielding layer 10, in a manner similar to that in the first embodiment, the present invention is not limited to the structure. The marking layer 11 may be directly formed under the lower shielding layer 4 by being formed on one of the substrates 2 prior to forming the laminated member. The position of the marking layer 17 may be changed variously.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A magnetoresistive head manufacturing method comprising the steps of:

forming on a substrate a laminated member composed of a lower shielding layer, a lower gap layer, a magnetoresistive sensor layer, an upper gap layer, and an upper shielding layer stacked from the bottom in that order;

forming, on at least one of the upper and lower surfaces of said laminated member, a marking layer which has a marker portion for detecting the center position in the widthwise direction of said magnetoresistive sensor layer as viewed from one end of said substrate and whose size in the widthwise direction changes at a fixed rate from said one end of said substrate toward the other end; and forming an arc-shaped medium-sliding surface, on which a recording medium slides, by lapping said one end of said substrate together with said laminated member in a state in which the center in the widthwise direction of a lapping sheet with the center in the widthwise direction of said magnetoresistive sensor layer by using the marker portion, exposing said marking layer from said medium-sliding surface so that a length in the widthwise direction of said marking layer is equal to a predetermined value corresponding to a length from the leading end to the rear end of said magnetoresistive sensor layer, and thereby exposing the leading end of said magnetoresistive sensor layer at the top of said arc-shaped medium-sliding surface.

2. A magnetoresistive head manufacturing method according to claim 1, wherein said marking layer has a slot extending from said one end of said substrate toward the other end, and said slot serves as said marker portion.

3. A magnetoresistive head manufacturing method according to claims 1, wherein said marking layer is shaped like a right-angled triangle having a side which extends from said one end of said substrate toward the other end and passes through the center in the widthwise direction of said magnetoresistive sensor layer, and said side serves as said marker portion.

* * * * *